United States Patent [19]

Fukushima et al.

[11] Patent Number: 5,151,128
[45] Date of Patent: Sep. 29, 1992

[54] INK, INK JET RECORDING METHOD EMPLOYING THE SAME, AND APPARATUS OR TOOL EMPLOYING THE SAME

[75] Inventors: Kyouko Fukushima, Yokohama; Koromo Shirota, Inagi; Shouji Koike, Yokohama, all of Japan

[73] Assignee: Canon Kabushiki Kaisha, Tokyo, Japan

[21] Appl. No.: 666,076

[22] Filed: Mar. 7, 1991

[30] Foreign Application Priority Data

Mar. 9, 1990 [JP] Japan .................................. 2-058763
Jan. 23, 1991 [JP] Japan .................................. 3-006384

[51] Int. Cl.⁵ .......................................... C09D 11/02
[52] U.S. Cl. ............................................... 106/20
[58] Field of Search ........................................ 106/20

[56] References Cited

U.S. PATENT DOCUMENTS 4,853,036 8/1989 Koike et al. .................. 106/20

*Primary Examiner*—William R. Dixon, Jr.
*Assistant Examiner*—Margaret V. Einsmann
*Attorney, Agent, or Firm*—Fitzpatrick, Cella, Harper & Scinto

[57] ABSTRACT

An ink includes: a recording agent; a liquid carrier medium; and an alkylether of polyoxyethylene-polyoxypropylene random polymer having the following general formula [I]:

$$R_1-(X)-O-R_2 \qquad [I]$$

wherein $R_1$ and $R_2$ each is a hydrogen atom or an alkyl group, with the proviso that they cannot both be a hydrogen atom, and X is a random polymer of ethylene oxide and polypropylene oxide.

3 Claims, 3 Drawing Sheets

INK, INK JET RECORDING METHOD EMPLOYING THE SAME, AND APPARATUS OR TOOL EMPLOYING THE SAME

BACKGROUND OF THE INVENTION

1. Field of the Invention

The present invention relates to an ink, an ink jet recording method which employs the same, and an apparatus or tool which employs the same. More particularly, the present invention relates to a high-speed fixing type ink capable of high definition and high image quality recording not only on sheets of coated paper specifically prepared for use in ink jet recording but also on sheets of non-coated paper, i.e., sheets of plain paper, generally used in offices or schools, such as copying paper, reporting paper, bond paper or payment slips; an ink jet recording method; a recording unit; an ink jet recording apparatus and an ink cartridge.

2. Description of the Related Art

Ink jet recording inks having various compositions have been reported. In recent years, research and development have been made on the composition and properties of the ink to provide an ink which fixes at a high speed to sheets of plain paper generally used in offices, such as copying paper, report paper, notebooks or letter paper, and which assures high definition recording on sheets of such paper.

For example, inks in which a high-boiling point organic solvent, such as glycol, is present for the purpose of preventing drying and clogging are known. Such an ink does not readily penetrate sheets of highly sized plain paper and hence does not dry fast when used in recording performed on such paper. Consequently, the ink may smear the hand when it is accidentally rubbed by the hand or the paper may be smeared by the ink.

Accordingly, it has been proposed in Japanese Patent Laid-Open No. 29546/1980 to add to the ink a large amount of surface active agent in order to promote penetration of the ink into the paper. However, the resultant ink runs greatly on some type of paper. Furthermore, when the ink jet head is charged with the ink, the ink may retract from the orifice surface and not be ejected. Conversely, the overall orifice surface may become wet with the ink and not eject the ink.

Japanese Patent Laid-Open No. 57862/1981 discloses a method of preparing a strong alkali ink. However, the strong alkali ink is hazardous, and may run and not dry fast on the sheets of paper which are subjected to sizing using some type of sizing agent, for example, sheets of neutral paper.

Japanese Patent Laid-Open No. 147870/1981 discloses a recording liquid in which alkyl ether of polyoxyethylene-polyoxypropylene block polymer is present. However, since block polymer behaves exactly in the same manner as the surface active agent, the resultant ink runs in an irregular whiskered fashion and hence deteriorates printing quality, although it penetrates the paper well.

Various other types of inks have also been proposed up to the present. However, no single ink is known which fulfills all the conditions regarding spreading, drying and clogging.

SUMMARY OF THE INVENTION

A primary object of the present invention is to provide an ink which runs less and allows the recorded matter to dry faster when it is used in recording conducted on sheets of non-coated paper, i.e., sheets of plain paper, generally used in offices, such as copying paper, reporting paper, notebooks or letter paper, an ink jet recording method which employs such an ink, and an apparatus or tool which employs the ink.

Another object of the present invention is to provide an ink which is safe to use in offices or households.

Another object of the present invention is to provide a reliable ink which does not readily generate clogging in the nozzles in an ink jet head, and ink jet recording method which employs the same, and an apparatus or tool which employs the same.

To achieve the aforementioned objects, the present invention provides an ink which comprises a coloring agent, a liquid carrier medium, and an alkyl ether of polyoxyethylene-polyoxypropylene random polymer having the following general formula [I]:

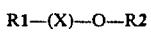

$$R1-(X)-O-R2 \qquad [I]$$

wherein R1 and R2 each is a hydrogen atom or an alkyl group, with the proviso that they cannot both be a hydrogen atom, and X is a random polymer of ethylene oxide and polypropylene oxide.

The present invention also provides an ink jet recording method in which recording is conducted on a recording medium by the ejection of an ink droplet from an orifice in accordance with a recording signal and which employs the above described ink.

The present invention also provides a recording unit which includes an ink container portion for holding an ink and a head portion for ejecting the ink in the form of an ink droplet, and which employs the aforementioned ink.

The present invention also provides an ink cartridge which has an ink container portion for holding an ink and which employs the aforementioned ink.

The present invention also provides an ink jet recording apparatus which includes a recording unit having an ink container portion for holding an ink and a head portion for ejecting the ink in the form of an ink droplet, and which employs the aforementioned ink.

The present invention also provides an ink jet recording apparatus which includes a recording head for ejecting an ink droplet, an ink cartridge having an ink container portion for holding an ink, and an ink supplying portion for supplying the ink from the ink cartridge to the recording head, and which employs the aforementioned ink.

DETAILED DESCRIPTION OF THE PREFERRED EMBODIMENTS

Figure 1A:
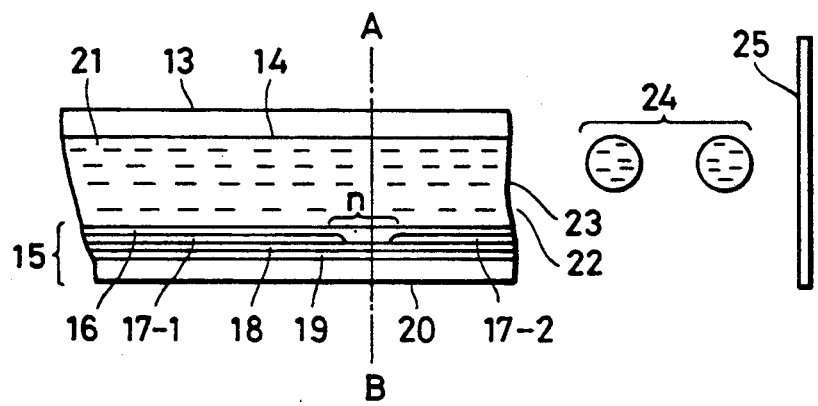
FIGS. 1 (*a*) and 1 (*b*) are respectively vertical and horizontal cross-sectional views of a head portion of an ink jet recording apparatus.

To prevent generation of ink runs and promote drying and penetration of an ink, the present inventors have made intensive studies on various ink compositions, and have discovered that the ink in which the compound having the general formula [I] is present is well balanced in terms of its spreading and penetration properties and is capable of reliably preventing clogging.

The present inventors have discovered that a random polymer of ethylene oxide and polypropylene oxide restricts spreading of an ink on a sheet of paper. Homopolymer of ethylene oxide further restricts spreading of the ink but deteriorates penetration. Conversely, homopolymer of propylene oxide promotes penetration of the ink but accelerates spreading and thus deteriorates printing quality. Block polymer of ethylene oxide and propylene oxide behaves like a surface active agent, and therefore promotes penetration but does not restrict spreading.

On the basis of the above-described discoveries, the present invention provides an ink in which an alkyl ether compound of a random polymer of ethylene oxide and propylene oxide is present. Thus, the ink according to the present invention spreads less and penetrates well on a sheet of paper.

The components of the ink according to the present invention will now be described.

The compound having the general formula [I], which is used in the present invention and features the present invention, is an alkyl ether compound of a random polymer of ethylene oxide and propylene oxide which can be obtained by the known method.

Examples of the compound having the general formula [I] are shown in Table 1 using R1, R2 and X. However, the present invention is not limited to these examples.

TABLE 1

| | | X (Random polymer portion) | | |
|---|---|---|---|---|
| | R$_1$ | Total number of EO | Total number of PO | R$_2$ |
| Compound 1 | CH$_3$ | 3 | 2 | H |
| Compound 2 | CH$_3$ | 9 | 6 | H |
| Compound 3 | CH$_3$ | 14 | 8 | H |
| Compound 4 | C$_2$H$_5$ | 10 | 8 | H |
| Compound 5 | C$_3$H$_7$ | 10 | 6 | H |
| Compound 6 | C$_4$H$_9$ | 10 | 6 | H |
| Compound 7 | C$_{10}$H$_{21}$ | 15 | 5 | H |
| Compound 8 | C$_8$H$_{17}$ | 18 | 4 | H |
| Compound 9 | C$_5$H$_{11}$ | 20 | 3 | H |
| Compound 10 | C$_4$H$_9$ | 20 | 10 | H |
| Compound 11 | CH$_3$ | 15 | 8 | C$_2$H$_5$ |
| Compound 12 | CH$_3$ | 18 | 8 | C$_4$H$_9$ |
| Compound 13 | C$_2$H$_5$ | 20 | 5 | C$_2$H$_5$ |
| Compound 14 | C$_2$H$_5$ | 18 | 4 | C$_4$H$_9$ |
| Compound 15 | C$_5$H$_{11}$ | 23 | 9 | CH$_3$ |

The aforementioned examples of compound [I] that can be employed in the present invention have been introduced by the present inventors through intensive researches made on the selection of R1, R2 and degree of addition polymerization of ethylene oxide and propylene oxide. An alkyl group having 10 or less carbons is desired as R1 and R2.

The preferred degree of polymerization of the random polymer portion is from 4 to 200, more preferably from 6 to 100. To achieve the object of the present invention more readily, it is desired that the proportion of ethylene oxide in the random polymer be larger than that of propylene oxide.

The compound having the general formula [I] may be employed solely or in the form of a mixture. The preferred proportion of the compound is 0.01 to 50 wt. %, more preferably 0.1 to 40 wt. %, and most preferably 0.2 to 30 wt. % of compound based on the total weight of the ink, although this proportion varies in accordance with the type of coloring agent or the components of liquid carrier medium which is employed together with the compound.

In addition to the coloring agent and the aforementioned compound, water and an organic solvent, which are generally used in the known inks, may also be used to obtain the ink according to the present invention. Examples of the suitable organic solvent include: an alkyl alcohol having 1 to 5 carbons, such as methyl alcohol, ethyl alcohol, n-propyl alcohol, isopropyl alcohol, n-butyl alcohol, sec-butyl alcohol, tert-butyl alcohol, isobutyl alcohol or n-pentanol; a halogenated derivative of any of these compounds; an amide, such as dimethyl formamide; a ketone or a ketoalcohol, such as acetone or diacetone alcohol; an ether, such as tetrahydrofuran or dioxane; an addition polymer of oxyethylene or oxypropylene, such as diethylene glycol, triethylene glycol, tetraethylene glycol, dipropylene glycol, tripropylene glycol, polyethylene glycol or polypropylene glycol; an alkylene glycol whose alkylene group includes 2 to 6 carbon atoms, such as ethylene glycol, propylene glycol, trimethylene glycol, butylene glycol, 1,2,6-hexanetriol or hexylene glycol; thiodiglycol; glycerine; a lower alkyl ether of a polyhydric alcohol, such as ethyleneglycol monomethyl (or ethyl) ether, diethyleneglycol monomethyl (or ethyl) ether or triethyleneglycol monomethyl (or ethyl) ether; a lower dialkyl ether of a polyhydric alcohol, such as triethyleneglycol dimethyl (or ethyl) ether or tetraethyleneglycol dimethyl (or ethyl) ether; sulforan, N-methyl-2-pyrolidone, 2-pyrolidone, 1,3-dimethyl-2-imidazolidinone.

The proportion of the above-described water-soluble organic solvent is 2 to 50 wt. %, more preferably, 2 to 30 wt. %, based on the total weight of the ink.

Although the liquid carrier medium may be used solely or in the form of a mixture, a liquid carrier medium which comprises water and at least one type of organic solvent is preferred. At least one type of water-soluble high-boiling point organic solvent is used as the at least one type of organic solvent. Examples of the water-soluble high-boiling point organic solvent include polyhydric alcohol, such as diethylene glycol, triethylene glycol, glycerine, 1,2,6-hexanetriol or thiodiglycol; and 2-pyrolidone Examples of coloring agent that can be added to the ink according to the present invention include a direct dye, an acid dye, a food color, a basic dye, a reactive dye, a disperse dye, a vat dye, a soluble vat dye, a reactive disperse dye, an oil dye and various types of pigments. Among these examples, a water-soluble dye is desired from the viewpoint of the performance of the ink.

Although the preferred weight proportion of the coloring agent changes in accordance with the types of the components of the liquid carrier medium and the characteristics required of the ink, it is in general about 0.2 to 20 wt. %, with a more preferred weight being between 0.5 to 10 wt. %, and with the most preferred one being between 1 to 5 wt. %, based on the total weight of the ink.

In addition to the above-described components, various types of dispersants, surface active agents, viscosity adjusting agents, surface-tension adjusting agents or fluorescent brighters may also be added to the ink according to the present invention so long as addition thereof does not hinder accomplishment of the objects of the present invention.

Examples of such additives include: a viscosity adjuster, such as polyvinyl alcohol, a cellulose or a water-soluble resin; a cation, anion or nonionic type surface active agent; a surface-tension adjuster, such as diethanolamine or triethanolamine; a pH-adjuster which employs a buffering agent; and a mildew-proofing agent.

In order to prepare an ink that can be used in the ink jet recording method of the type in which the ink is electrically charged, a specific resistance adjuster of an inorganic salt, such as lithium chloride, ammonium chloride or sodium chloride, is added. The ink according to the present invention is particularly suitable for use in the ink jet recording method of the type in which an ink is ejected as a consequence of bubbling of the ink which is conducted using heat energy. The ink according to the present invention ensures stable ejection and does not generate satellite dots when it is used in the above-described type of ink jet recording method. In that case, adjustment of the thermal properties (specific heat, coefficient of thermal expansion, coefficient of thermal conductivity and so on) of the ink may be conducted.

In order to solve the problems involving ink runs on a sheet of plain paper, drying of the recorded matter, and penetration of the ink, and in order to obtain excellent matching to the recording head, the surface tension of the ink according to the present invention is adjusted to 30 to 68 dyne/cm at 25° C., and the viscosity is adjusted to 15 cP or less, preferably, to 10 cP or less, and more preferably, to 5 cP or less.

To prepare an ink which has the above-described properties and to solve the problems which occur when recording is conducted on the sheets of plain paper, the proportion of the water contents in the ink is set between 50 wt. % and 95 wt. %, more preferably, between 60 wt. % and 95 wt. %.

Although the ink according to the present invention is in particular suitable for use in the ink jet recording method in which recording is conducted by the ejection of the ink droplets due to the action of thermal energy, it can also be used for general writing utensils.

The methods and apparatus suitable for the use of the ink of the present invention are those which provide thermal energy to the ink in a cell in a recording head in accordance with recording signals to form liquid droplets by applying thermal energy.

Figure 1B:
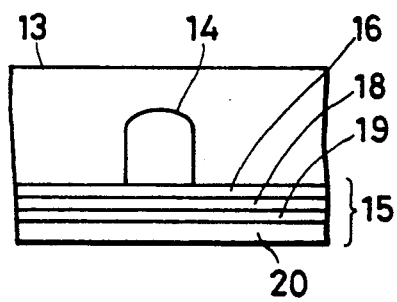
Figure 2:
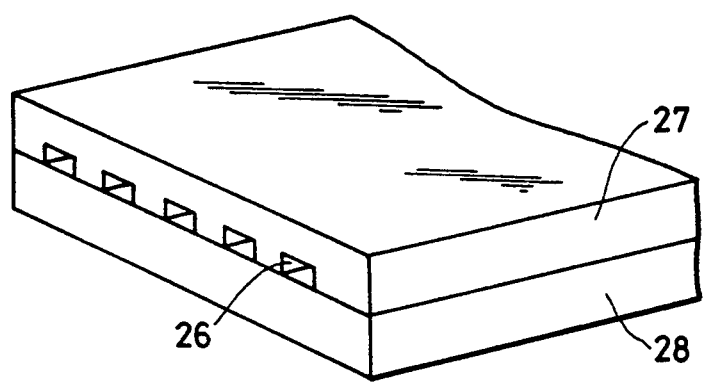
FIG. 2 is a perspective view showing an external view of a multi-head which consists of the heads shown in FIG. 1.

An example of the constitution of the heads, which is a main portion of the apparatus, is shown in FIG. 1(a), FIG. 1(b), and FIG. 2.

FIG. 1(a) is a cross-sectional view of a head 13 along an ink flow path, and FIG. 1(b) is a cross-sectional view of the head at the line A-B in FIG. 1(a).

The head 13 is formed by bonding a plate of glass, ceramics, or plastics having a groove 14 with a heat-generating head 15. (The type of the head is not limited to the one shown in the figure.) The heat-generating head 15 is constituted of a protection layer 16 formed of silicone oxide or the like, aluminum electrodes 17-1 and 17-2, a heat-generating resistance layer 18 formed of nichrome or the like, a heat accumulation layer 19, and a substrate plate 20 having a good heat-releasing property made of alumina or the like.

Ink 21 reaches the ejection orifice 22 (a fine pore), forming a meniscus by action of pressure P not shown in the figure.

On application of an electric signal to the electrodes 17-1 and 17-2, the region designated by a symbol "n" on the heat-generation head 15 instantly generates heat to form a bubble in the ink 21 at the position adjacent thereto. The pressure generated by the bubble pushes out the meniscus 23 and ejects the ink 21, as a recording droplets 24, and the ink droplets are discharged to a recording medium 25. FIG. 2 illustrates an appearance of a multi-head constructed by juxtaposing a multiplicity of heads shown in FIG. 1(a). The multi-head is prepared by bonding a glass plate having multi-grooves with a heat-generation head 28 similar to the one described in FIG. 1(a).

Figure 3:
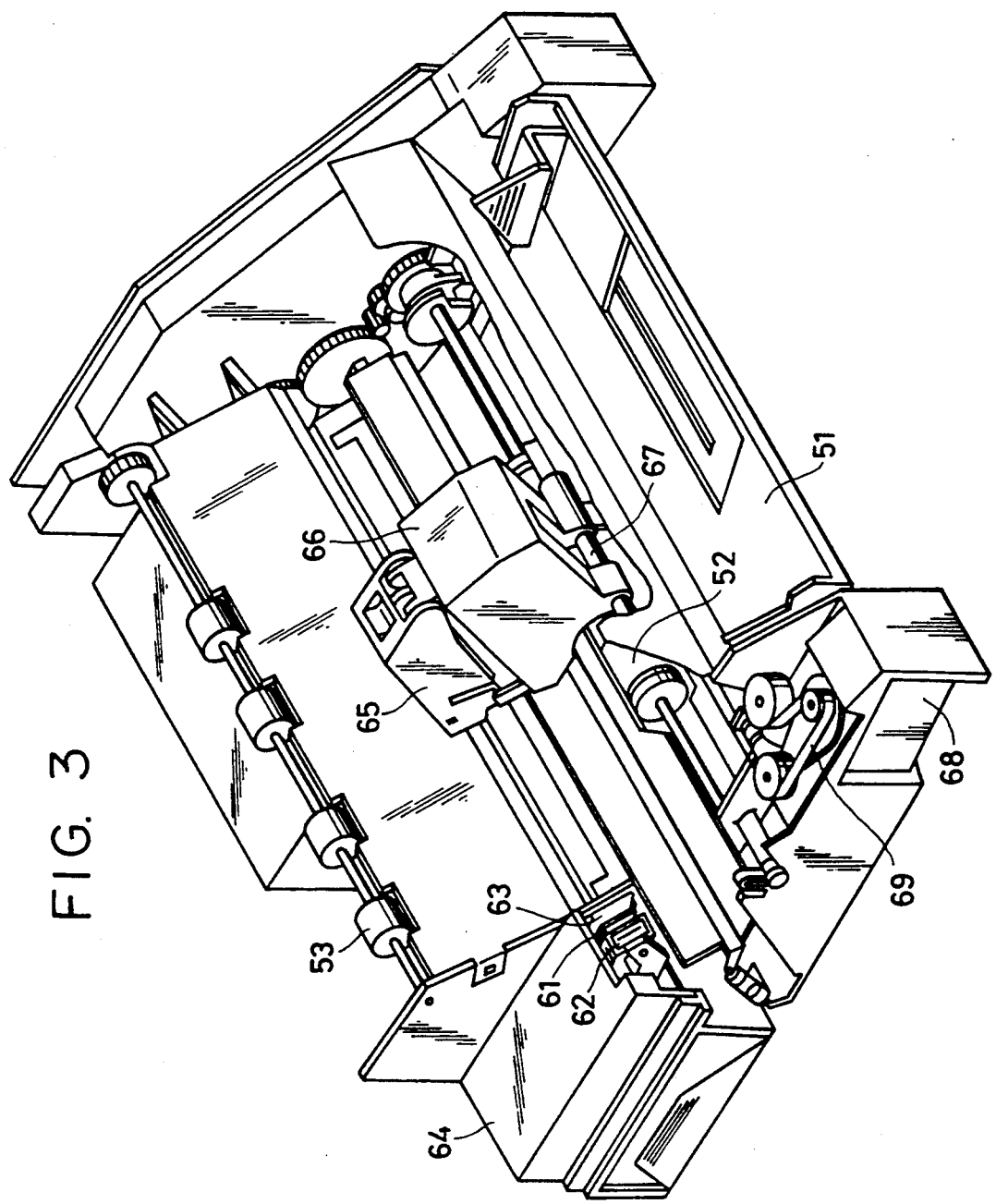
FIG. 3 is a perspective view of an ink jet recording apparatus.

FIG. 3 illustrates an example of the ink-jet recording apparatus having such a head mounted therein.

In FIG. 3, a blade 61 functioning as a wiping member is held at one end by a blade holding member, forming a fixed end in a form of a cantilever. The blade 61 is placed at a position adjacent to the recording region of the recording head, and in this example, is held in a position protruding into the moving path of the recording head. A cap 62 is placed at a home position adjacent to the blade 61, and is constituted such that it moves in the direction perpendicular to the moving direction of the recording head to come into contact with the ejection nozzle face to cap the nozzles. An ink absorption member 63 is provided at a position adjacent to the blade 61, and is held protruding into the moving path of the recording head in a manner similar to that of the blade 61. The aforementioned blade 61, the cap 62 and the absorption member 63 constitute an ejection-recovery section 64, and the blade 61 and the absorption member 63 remove water, dust, and the like from the ink ejecting nozzle face.

A recording head 65 has an ejection energy generation means for ejection, and conducts recording by ejecting ink toward a recording medium opposing to the ejection nozzle face. A carriage 66 is provided for supporting and moving the recording head 65. The carriage 66 is engaged slideably with a guide rod 67. A portion of the carriage 66 is connected (not shown in the figure) to a belt 69 driven by a motor 68, so that the carriage 66 is movable along the guide rod 67 to the recording region of the recording head and an adjacent region thereto.

A paper delivery portion 51 for delivery of a recording medium and a paper delivery roller 52 driven by a motor (not shown in the figure) deliver the recording medium to a position opposing the ejecting nozzle face of the recording head, and the recording medium is discharged during the progress of the recording to a paper discharge portion provided with paper-discharge rollers 53.

In the above constitution, the cap 62 of the ejection-recovery portion 64 is out of the moving path of the recording head 65, while the blade 61 is protruded toward the moving path. Therefore, the ejecting nozzle face of the recording head 65 is wiped therewith. The cap 62 moves to protrude toward the moving path of the recording head when the cap 62 comes into contact for capping with the ejecting nozzle face of the recording head.

At the time when the recording head moves from the home position to the record starting position, the cap 62 and the blade 61 are at the same position as in the above-mentioned wiping time, so that the ejection nozzle face of the recording head is wiped also in this movement.

The recording head moves to the home position not only at the end of the recording and at the time of ejection recovery, but also at a predetermined interval during movement for recording in the recording region. By such movement, the wiping is conducted.

Figure 4:
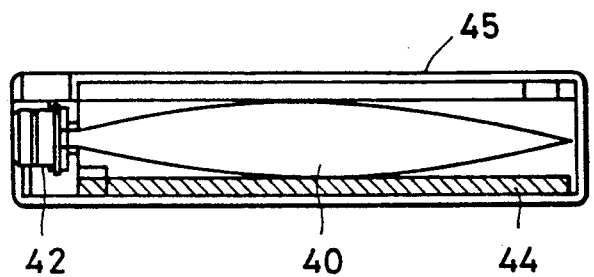
FIG. 4 is a vertical cross-sectional view of an ink cartridge.

FIG. 4 illustrates an example of the ink cartridge 45 containing ink to be supplied through an ink supplying member such as a tube (not shown). The ink container portion 40, for example an ink bag, contains an ink to be supplied, and has a rubber plug 42 at the tip. By inserting a needle (not shown in the figure) into the plug 42, the ink in the ink container portion 40 is made suppliable. An absorption member 44 absorbs waste ink.

The ink container portion has preferably a liquid-contacting face made of polyolefin, especially polyethylene in the present invention.

Figure 5:
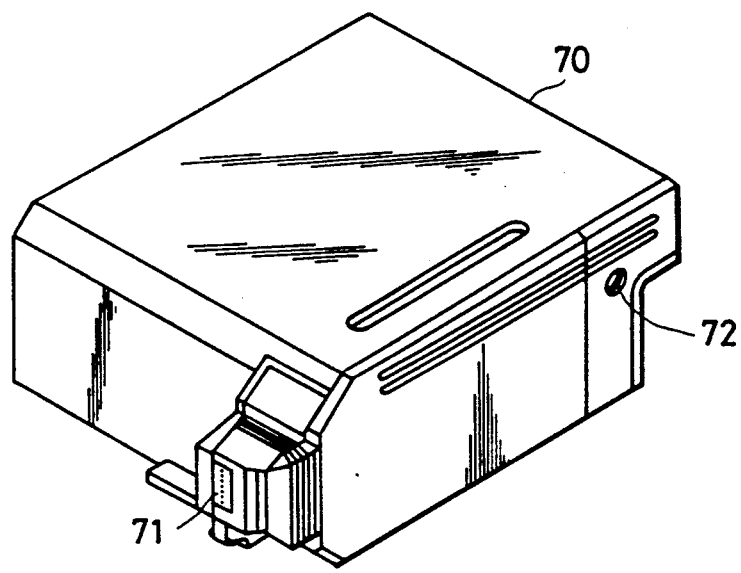
FIG. 5 is a perspective view of a recording unit.

The ink-jet recording apparatus used in the present invention is not limited to the one above-described which has separately a head and an ink cartridge, but integration thereof as shown in FIG. 5 may suitably be used.

In FIG. 5, a recording unit 70 houses an ink container portion, such as an ink absorption member, and the ink in the ink absorption member is ejected from a head 71 having a plurality of orifices. The material for the ink absorption member is preferably polyurethane foam in the present invention.

Air-communication opening 72 is provided to communicate the interior of the recording unit with the open air.

The recording unit 70 may be used in place of the recording head shown in FIG. 3, and is readily mountable to and demountable from the carriage 66.

EXAMPLES

Examples and Comparative Examples with the present invention will now be described. All parts and percents hereinafter referred to are in weight percents unless otherwise stated.

EXAMPLES 1 TO 5

Each of the following compositions was mixed and then stirred for five hours. Thereafter, pH of the mixture was adjusted to 7.5 using aqueous solution of 0.1% sodium hydroxide. Subsequently, the mixtures were filtered under pressure using a membrane filter having a pore size of 0.22 μm (manufactured by Sumitomo Denko Kabushiki Gaisha, trademark: Fluoropore) to obtain inks A to E according to the present invention.

Next, recording was performed on sheets of copying and bond paper which were available on the market using inks A to E and an ink jet printer BJ130 (which is the trademark of the ink jet recording apparatus of the type which employs the heat generating elements as the ink ejecting energy source, manufactured by Canon Inc.). Evaluations were made on the fixing property of the printed matter, on the rate of generation of ink runs in a whiskered form, on occurrence of clogging when printing was restarted after temporary suspension, and on the frequency response. The results of the evaluations are shown in Table 2.

| Ink A | |
|---|---|
| C.I. Direct Yellow 86 | 2 parts |
| Diethylene glycol | 5 parts |
| Compound No. 6 | 15 parts |
| Water | 78 parts |
| Ink B | |
| C.I. Acid Red 35 | 2 parts |
| Glycerine | 7 parts |
| Compound No. 2 | 5 parts |
| Compound No. 3 | 5 parts |
| Ethylene glycol | 5 parts |
| Water | 76 parts |
| Ink C | |
| C.I. Food Black 2 | 3 parts |
| Triethylene glycol | 10 parts |
| N-methyl-2-pyrolidone | 2 parts |
| Compound No. 7 | 1 part |
| Water | 84 parts |
| Ink D | |
| C.I.Direct Blue 199 | 2.5 parts |
| Polyethylene glycol (molecular weight: 300) | 5 parts |
| Diethylene glycol | 10 parts |
| Triethyleneglycol monomethyl ether | 2 parts |
| Triethanolamine | 0.5 part |
| Compound No. 11 | 3 parts |
| Water | 77 parts |
| Ink E | |
| C.I. Direct Blue 154 | 2 parts |
| Thiodiglycol | 6 parts |
| Diethylene glycol | 9 parts |
| Compound No. 10 | 10 parts |
| Water | 73 parts |

COMPARATIVE EXAMPLES 1 TO 4

The following compositions were processed in the same manner as that of Examples 1 to 5 to obtain inks F to I for Comparative Examples 1 to 4. The same evaluations were made on the obtained inks. The results of the evaluations are shown in Table 2.

| Ink F | |
|---|---|
| C.I. Direct Yellow 86 | 2 parts |
| Diethylene glycol | 20 parts |
| Water | 78 parts |
| Ink G | |
| C.I. Food Black 2 | 3 parts |
| Diethylene glycol | 10 parts |
| Triethylene glycol | 10 parts |
| Nonion type surface active agent (trademark: Nissan Nonion P223, manufactured by Nihon Yushi K.K.) | 0.5 part |
| Water | 76.5 parts |
| Ink H | |
| C.I. Direct Black 154 | 2 parts |
| Thioglycol | 6 parts |
| Diethylene glycol | 9 parts |
| Compound No. 10 with the polymer portion which is block polymer | 10 parts |
| Water | 73 parts |
| Ink I | |
| C.I.Food Black 2 | 3 parts |
| Triethylene glycol | 10 parts |
| N-methyl-2-pyrolidone | 2 parts |
| Ethanol | 1 part |
| Water | 84 parts |

TABLE 2

| | | Ink | | | | |
|---|---|---|---|---|---|---|
| | | A | B | C | D | E |
| | | Example | | | | |
| | | 1 | 2 | 3 | 4 | 5 |
| (1*) Fixing | (Copying paper) | ⓒ | ⓒ | ⓒ | ⓒ | ⓒ |
| | (Bond paper) | ⓒ | ⓒ | ⓒ | ⓒ | ⓒ |
| (2*) Rate of generation of ink runs | | | | | | |
| | (Copying paper) | c | c | c | c | c |

TABLE 2-continued

| | Ink | | | | |
|---|---|---|---|---|---|
| | A | B | C | D | E |
| (Bond paper) | ⊙ | ⊙ | ⊙ | ⊙ | ⊙ |
| (3*) Clogging when printing is restarted after temporary suspension | ⊙ | ⊙ | ⊙ | ⊙ | ⊙ |
| (4*) Frequency response characteristics | ⊙ | ⊙ | ⊙ | ⊙ | ⊙ |

| | Comparative Example | | | |
|---|---|---|---|---|
| | 1 | 2 | 3 | 4 |
| (1*) Fixing (Copying paper) | x | ⊚ | ⊚ | Δ |
| (Bond paper) | x | ⊚ | ⊚ | ⊙ |
| (2*) Rate of generation of ink runs | | | | |
| (Copying paper) | Δ | x | x | ⊙ |
| (Bond paper) | ⊙ | x | x | ⊙ |
| (3*) Clogging when printing is restarted after temporary suspension | Δ | x | x | x |
| (4*) Frequency response characteristics | x | Δ | Δ | Δ |

(1*) Fixing property

Printing was performed on the sheets of copying paper and bond paper. The printed matter was rubbed 10 and 30 seconds after being printed, respectively, using a sheet of filtering paper (trademark: NO. 5C, manufactured by Toyo Roshi K.K.) (printing was performed at 25° C. and 60%RH).

⊚... No blurring occurred 10 seconds after being printed o... Slightly blurred 10 seconds after being printed Δ... Slightly blurred 30 seconds after being printed x... Greatly blurred 30 seconds after being printed (2*) Rate of generation of ink runs 300 dots were printed separately on sheets of copying paper and bond paper. After they were dried for over one hour, the number of dots in which ink ran in a whiskered fashion was counted with a microscope and shown in terms of the percentage of the total number of dots (printing was conducted at 25° C. and 60%RH).

o : 10% or less

Δ: 11 to 30% x : 31% or above (3*) Clogging when printing is restarted after temporary suspension After alphanumeric characters were continuously printed for ten minutes using the printer charged with a predetermined ink, printing was suspended and the printer was then left in an uncapped state for ten minutes. Thereafter, alphanumeric characters were printed again. Occurrence of clogging was determined by the presence of defects in the printed characters, such as fainting or breakage thereof (evaluation was performed at 25° C. and 60% RH).

o : No faults occurred even in the first character

Δ: Part of the first character was fainted or broken x : The first character could not be printed at all (4*) Frequency response The printed condition of the obtained printed matter, such as fainting or blanking, and faulty landing, such as splash or twist, were visually observed and evaluated.

⊚... Response of the ink to the frequency was excellent and neither fainting, blanking nor faulty landing occurred in either solid or character printing.

o... Response of the ink to the frequency was substantially good, and neither fainting, blanking nor faulty landing occurred in the character printing but fainting occurred slightly in the solid printing.

Δ... Neither fainting nor blanking occurred in the character printing but faulty landing partially occurred. About one third of the solid printed matter was fainted or blank.

x... Most part of the solid printed matter was fainted or blank. Fainting and faulty landing also occurred in the character printing.

As will be understood from the foregoing description, it is possible according to the present invention to provide an ink capable of high definition and high penetration recording on sheets of non-coated paper, i.e., sheets of plain paper, normally used in offices or schools, such as copying paper, report paper, notebooks or letter paper, without generating ink runs.

It is also possible according to the present invention to provide an ink which is safe to use in offices or households.

The ink according to the present invention is capable of highly reliable recording without clogging of the nozzles of an ink jet head. In particular, the ink according to the present invention assures excellent response to the frequency in the recording of the type which utilizes bubbling of the ink due to application of thermal energy for the ejection of the ink.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink comprising
   (i) a coloring agent in an amount ranging from 0.2 to 20 wt. % based on the total weight of the ink,
   (ii) a liquid carrier medium comprising a mixture of water in an amount ranging from 50 to 95 wt. % based on the total weight of the ink and a water-soluble organic solvent in an amount ranging from 2 to 50 wt. % based on the total weight of the ink, and
   (iii) an alkyl ether of a polyoxyethylene-polyoxypropylene random polymer having the following general formula [I]:

$$R_1-(X)-O-R_2 \qquad [I]$$

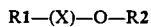

wherein R1 and R2 each is a hydrogen atom or an alkyl group, with the proviso that they cannot both be a hydrogen atom, and X is a random polymer of $(OC_2H_4)$ and $(OC_3H_8)$ units with a degree of polymerization of 5-32, wherein the $(OC_2H_4)$ units are in a larger proportion than the $(OC_3H_6)$ units, and wherein said alkyl ether is in an amount ranging from 0.01 to 50 wt. % based on the total weight of the ink, said ink having a surface tension ranging from 30 to 68 dyne/cm at 25° C. and a viscosity of 15 cP or less.

2. The ink according to claim 1, wherein R1 and R2 each is an alkyl group having 10 or less carbons.

3. The ink according to claim 1, wherein said liquid carrier medium includes a mixture of water and water soluble organic solvent which contains at least one component among diethylene glycol, triethylene glycol, glycerine, 1,2,6-hexanetriol, thiodiglycol and 2-pyrolidone.

* * * * *

UNITED STATES PATENT AND TRADEMARK OFFICE
CERTIFICATE OF CORRECTION

PATENT NO. : 5,151,128

DATED : September 29, 1992

INVENTOR(S) : Fukushima et al.

It is certified that error appears in the above-identified patent and that said Letters Patent is hereby corrected as shown below:

COLUMN 4:

Line 33, "pyrolidone" should read --pyrrolidone--;
Line 34, "pyrolidone" should read --pyrrolidone--;
Line 46, "pyrolidone" should read --pyrrolidone--; and
Line 67, "brighters" should read --brighteners--.

COLUMN 6:

Line 65, "record starting" should read --record-starting--.

COLUMN 8:

Line 11, "pyrolidone" should read --pyrrolidone--; and
Line 56, "pyrolidone" should read --pyrrolidone--.

UNITED STATES PATENT AND TRADEMARK OFFICE
CERTIFICATE OF CORRECTION

PATENT NO. : 5,151,128

DATED : September 29, 1992

INVENTOR(S) : Fukushima et al.

It is certified that error appears in the above-identified patent and that said Letters Patent is hereby corrected as shown below:

<u>COLUMN 10</u>:

Line 54, "$(OC_3H_8)$" should read --$(OC_3H_6)$--;
Line 58, "ink, said" should read --ink,-- and new paragraph beginning with --said ink--; and
Line 67, "pyrolidone" should read --pyrrolidone--.

Signed and Sealed this

Ninth Day of November, 1993

Attest:

BRUCE LEHMAN

Attesting Officer

Commissioner of Patents and Trademarks